United States Patent [19]
Vogeley et al.

[11] Patent Number: 5,612,736
[45] Date of Patent: Mar. 18, 1997

[54] STYLUS POSITION SENSING AND DIGITAL CAMERA WITH A DIGITAL MICROMIRROR DEVICE

[75] Inventors: James H. Vogeley; Arthur W. Vogeley, both of Yorktown; Giles K. Davis, Newport News, all of Va.

[73] Assignee: nVIEW Corporation, Newport News, Va.

[21] Appl. No.: 475,995

[22] Filed: Jun. 7, 1995

[51] Int. Cl.$^6$ .................................................. H04N 5/225
[52] U.S. Cl. .......................................... 348/207; 348/335
[58] Field of Search ...................................... 348/770, 771, 348/207, 231, 344; 358/335; 359/291, 292, 293, 259, 846, 847, 850, 224; 345/13; H04N 5/225

[56] References Cited

U.S. PATENT DOCUMENTS

| | | | |
|---|---|---|---|
| 3,949,392 | 4/1976 | Caritato | 345/108 |
| 4,460,943 | 7/1984 | Callahan | 362/276 |
| 4,613,866 | 9/1986 | Blood | 342/448 |
| 4,713,541 | 12/1987 | Renaud et al. | 250/231.18 |
| 4,739,163 | 4/1988 | Gambs et al. | 250/231.18 |
| 5,212,555 | 5/1993 | Stoltz | 348/335 |
| 5,239,373 | 8/1993 | Tang et al. | 348/14 |
| 5,369,433 | 11/1994 | Baldwin et al. | 348/207 |

OTHER PUBLICATIONS

Younse; "Mirrors On A Chip"; IEEE Spectrum, vol. 30, No. 11, Nov. 1993, pp. 27–31.

Takahashi et al.; "Optical System And Characteristics Of An LCD Projector With Interleaved Pixels Using Four LCD Projectors"; IEEE Transactions On Circuits And Systems For Video Technology, M vol. 5, No. 1, Feb. 1995; pp. 41–47.

Hamada et al.; "A New Bright Single Panel LC–Projection System Without A Mosaic Color Filter"; Liquid Crystal Labs. Liquid Crystal Display Group, Sharp Corporation. pp. 422–423.

*Primary Examiner*—John K. Peng
*Assistant Examiner*—Tuan V. Ho
*Attorney, Agent, or Firm*—Nixon & Vanderhye P.C.

[57] ABSTRACT

Disclosed is a digital micromirror device (DMD) based projector in which the position of a stylus with respect to a projected image can be determined automatically. In one embodiment, the stylus includes a detector capable of detecting illumination from a single pixel and the plurality of pixels in the DMD array are sequentially energized until a pixel reflects light to the stylus detector. Since the location of that pixel is known, the position of the stylus adjacent that pixel on the image is also known. In another embodiment, light is emitted from the stylus and the DMD array is sequenced in order to reflect light from the array to a photodetector. Again, when a pixel is sequenced so as to reflect light to the detector, the position of the stylus with respect to the image is related to the image of the pixel with respect to the pixel's location in the array. A further embodiment utilizes a general illumination source of the screen with infrared radiation and a reflective stylus which reflects the infrared radiation back to the DMD array. As before, sequencing of the DMD array and detection of the pixel associated with the reflected IR radiation provides an indication of the stylus location. In a further embodiment, a DMD array is utilized to sequentially address all of the pixels of a subject image thereby providing an output of each sequenced pixel to a data storage device forming a digital camera.

19 Claims, 13 Drawing Sheets

BASIC DMD PIXEL OPERATION

DMD PROJECTOR IN PIXEL "ON" CONDITION

DMD PROJECTOR IN PIXEL "OFF" POSITION

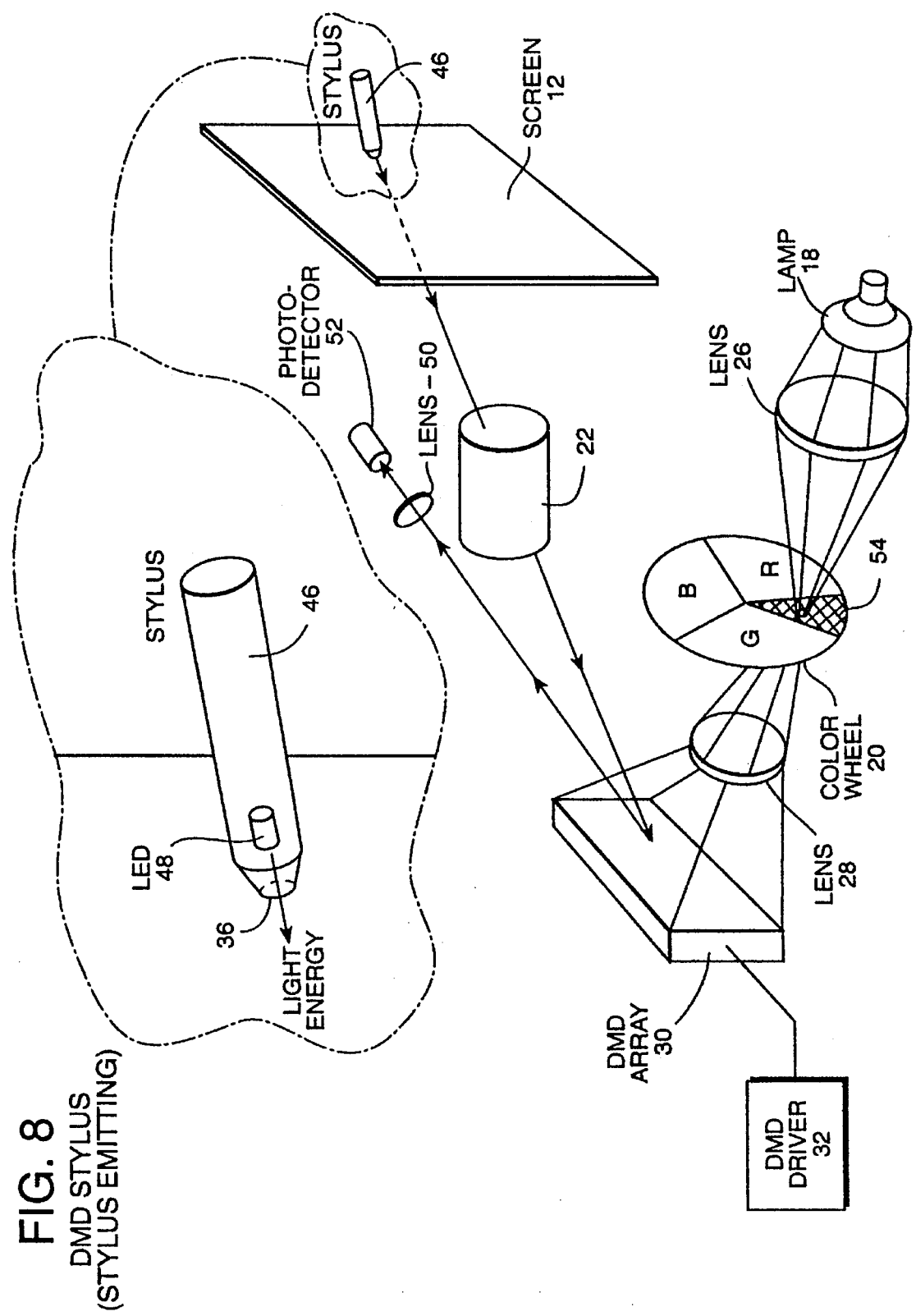

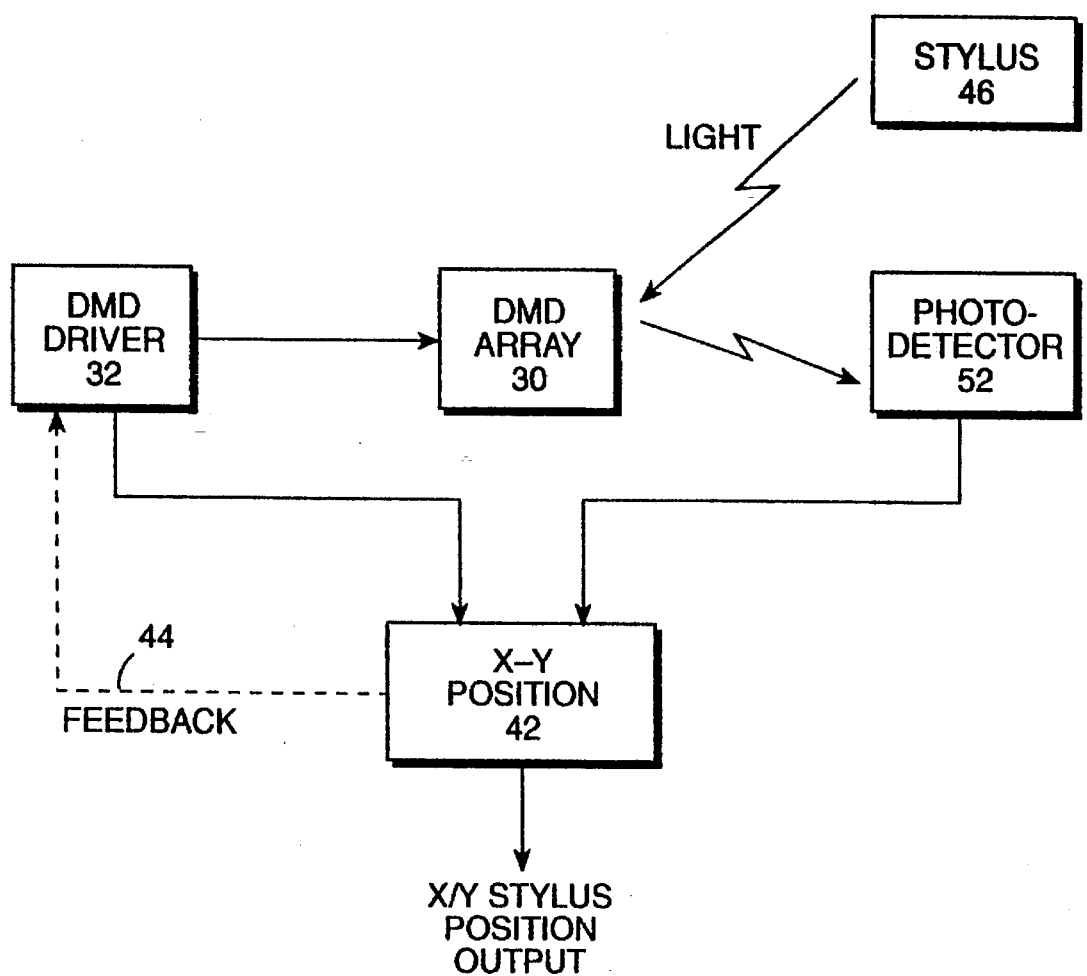

DMD PROJECTOR WITH EMITTING STYLUS
IN "OFF-TO-ON" POSITION—SCANNING MODE

DIGITAL CAMERA BLOCK DIAGRAM 5,612,736

STYLUS POSITION SENSING AND DIGITAL CAMERA WITH A DIGITAL MICROMIRROR DEVICE

BACKGROUND OF THE INVENTION

1. Field of the Invention

The present invention relates generally to stylus position sensing and specifically relates to stylus position sensing in conjunction with an image projected by a Digital Micromirror Device (DMD). The present invention further relates to the use of a DMD to form a digital camera.

2. Discussion of Prior Art

Over the last several years, Texas Instruments, Inc. has been testing and developing a Digital Micromirror Device (DMD) which can be used effectively in a projection arrangement to control projected light with minimal losses. U.S. Pat. No. 4,680,579, issued Jul. 14, 1987 to Ott, entitled "Optical System for Projection Display Using Spatial Light Modulator Device," U.S. Pat. No. 5,142,405, issued Aug. 25, 1992 to Hornbeck, entitled "Bistable DMD Addressing Circuit and Method" and U.S. Pat. No. 5,192,946, issued Mar. 9, 1993 to Thompson et al., entitled "Digitized Color Video Display System" disclose the basic DMD concept, as well as its application to projector systems, the disclosures of which are herein incorporated by reference.

To simplify the discussion somewhat, Applicant encloses FIGS. 1–3 directed to a general overview of DMD operation when used with a projector system. FIG. 1 illustrates the basic DMD pixel mirror operation and it is noted that this operation would be the same with respect to each of the multiplicity of pixel mirrors in a typical DMD device. While DMDs have been created which have resolutions of 2048× 1152 pixels, only a single pixel mirror will be discussed with respect to the prior art. Each pixel is in fact a miniature mirror which can be electronically directed to an "ON" and "OFF" position. Typically, the mirror is oriented so that it moves through an angle of 2θ.

With respect to the horizontal in FIG. 1, the DMD pixel mirror 10 can move from the "ON" position having an angle +θ to an "OFF" position having an angle of −θ. Quite clearly, it can be seen that with respect to the perpendicular with respect to the screen, perpendiculars with respect to the micromirror also move between +θ and −Θ0 when in the "ON" and "OFF" positions, respectively. The dotted line position of the DMD mirror is its unpowered, undeflected position. This "relaxed" position takes no part in the actual operation of the device. When the DMD chip is powered, each pixel mirror is driven and latched into either an "ON" or "OFF" position. In these positions, as shown, the mirror is deflected and held against hard stops 14, 16 for very precise angular control. While the deflection angle can vary depending upon the needs and the particular device, the angle θ is typically 10° and thus, the mirror can tilt + or −10° about its "relaxed" position.

One characteristic of digital micromirrors is their ability to move from an "ON" to an "OFF" position with extreme rapidity. Typical mirror transit times from the "ON" to the "OFF" position is on the order of 10 microseconds. This permits the individual pixel to be turned on and off so as to provide a variable duty cycle (the ratio of "ON" time to total time) which provides a grey scale capability for projected images.

FIGS. 2 and 3 illustrate the application of an array 30 of micromirrors in a typical DMD projector with the pixel in the "ON" and "OFF" position. FIG. 2 illustrates the DMD 10 being held against the "ON" stop 14 in the conventional manner. Light from an illuminator 18 is projected through a color wheel 20 towards the DMD. The light can be from any light source including incandescent, halogen and other light sources, although a xenon arc lamp is a particularly bright source of light providing a bright projected image.

In a color projector embodiment, the light passes through a rotating color wheel 20 which includes three primary color segments and can optionally include a fourth area which permits passage of only infrared light. While the color wheel 20 rotates at a high enough speed so that the flickering of projected light is not perceived by the human eye, the amount of light actually reflected from the DMD through the projection lens 22 onto the screen 12 is controllable by modulating the duty cycle of each DMD pixel mirror. If extremely bright light is required for the particular color (the color is determined by the rotational position of the color wheel), the DMD has a high duty cycle, i.e., it is "ON" a great percentage of its time. If very little of the particular color is needed, the duty cycle is low and the DMD is "ON" only a small portion of the time for that pixel.

It can be seen that the light projected towards the DMD is projected at an angle 2θ with respect to a perpendicular to the screen 12. With the DMD in the "ON" position (where "ON" is +θ), light reflected from the DMD will pass directly through the projection lens 22 and strike the screen 12, and, in conjunction with light reflected from other DMD pixels, forms a projected image.

FIG. 3 illustrates the same DMD pixel in the DMD projector except that the pixel is in the "OFF" position and is held against stop 16. It will be recalled that with respect to light being reflected from a mirror, the angle of incidence is equal to the angle of reflection. This can be seen in FIG. 2 where the incidence angle is θ and thus the exit angle is Θ (with respect to the pixel mirror). When the pixel mirror rotates to the "OFF" position as shown in FIG. 3, it can be seen that the angle of light from the illuminator 18 is equal to 3θ and therefore, the exit angle is also 3Θ (both with respect to the DMD pixel mirrors perpendicular). A light trap 24 is provided which absorbs light from the illuminator. Accordingly, by modulating the duty cycle and the amount of time spent in the "ON" and "OFF" positions, the timewise intensity of light projected through lens 22 and onto screen 12 can be modulated by each pixel mirror in the DMD projector.

By controlling the individual pixel mirrors in synchronization with the rotational position of the color wheel, the red, blue and green light from each rotation of the color wheel can be controlled so that it is projected at the same spot on the screen (the spot determined by which pixel is reflecting the light through lens 22). The ability to control not only grey scale or average intensity, but also to project the light through three primary colors permits the mixing of the primary color light to form different and various shades of color. By suitably driving all of the pixel mirrors in a DMD projector individually, each of the pixels projected upon the screen can be separately controlled as to color and intensity. Accordingly, any visual image can be created on the screen.

The image the projected can be a computer generated image, a video in any one of the PAL, NTSC, SECAM or any other image format. Thus, the DMD projector can serve to project full color images on a remote screen in a manner similar to that of existing liquid crystal display (LCD) projectors. However, where an LCD selectively absorbs portions of the light transmitted therethrough, the display is heated by the projector light requiring extensive cooling systems and cooling schemes. Such cooling schemes are disclosed in detail in U.S. Pat. No. 4,763,993, issued Aug. 16, 1988, entitled "Liquid Crystal Display For Projection Systems" by Vogeley et al. and assigned to the assignee of the present invention.

Even in its most transparent state, however, an LCD absorbs a significant portion of light to be projected therethrough and thus the overall brightness of the projected image suffers. Because the DMD projector has generally greater than 90% of the light incident upon the DMD device reflected therefrom, its images are significantly brighter than a corresponding LCD projector given the same brightness illumination source.

As discussed in U.S. Pat. No. 5,235,363, entitled "Method and Apparatus for Interacting With a Computer Generated Projected Image," issued Aug. 10, 1993 to Vogeley et al. and assigned to the assignee of the present application, it is desirable to be able to interact with a computer generated projected image especially during presentations based upon the computer generated image. Disclosed in the '363 patent (and also in the continuation-in-part of the same title filed May 28, 1993 with Ser. No. 08/069,001 for which the Issue Fee was paid on Mar. 20, 1995), various methods for determining the position of a stylus or a stylus directed beam of light with respect to the projected image are disclosed.

In each of the embodiments discussed in the '363 patent, a portion of light reflected from the screen was diverted to, in a preferred embodiment, a position sensing diode which determined the X and Y positions of the point of light on the screen and thus the position of the stylus relative to the image. While a similar device could be utilized with a DMD projector, it is desirable to avoid the need for a separate position sensing diode and the electronic circuitry related thereto if at all possible.

SUMMARY OF THE INVENTION

Accordingly, in view of the above, it is an object of the present invention to provide a method and apparatus for determining the position of a stylus with respect to an image projected by a DMD projector.

It is a still further object of the present invention to provide a digital camera using the DMD array as an image scanning device.

The above and other objects are achieved in accordance with the present invention by scanning, either sequentially or in binary form, individual pixel mirrors in a DMD and utilizing the stylus to indicate or sense the pixel which is activated closest to the stylus position. The sequential or binary energization of pixel mirrors occurs during a time duration between sequential frame images and thus is not perceived by the human eye.

In a first embodiment, the stylus may include a photo detector. The color wheel includes a segment for passing only infrared radiation. This IR radiation is sequentially projected by the DMD pixel mirrors to the screen. The timing of the receipt of radiation at the stylus and the timing of the DMD pixels which have been energized, will indicate which of the pixels (in the sequential scan) or which blocks of pixels (in the binary scan) are responsible for the IR, thereby providing the pixel location of the stylus.

In a second embodiment, the stylus merely projects a beam of light during a blanking phase between two frames of the projected image, each of the pixels is sequentially or binarily energized (either "ON" to "OFF" or "OFF" to "ON"). A light sensitive detector (preferably a phototransistor) is provided at a focal point of the projection optics such that, when light emitted from the stylus is reflected back through the DMD pixel located closest to the light, the detector provides an output signal indicative of the light. Because the timing of when the light is perceived by the detector and when each pixel is energized (either in sequential or binary form) is known, the precise location of the light can be determined with a high degree of resolution.

A further embodiment provides a general illumination of the screen with IR energy from a general source. Sequential scanning of the DMD pixel mirrors in either sequential or binary form results in IR light being reflected, by means of a reflector located in the stylus, back through the projection optics to a IR detector in the device. Again, the location of the pixel or block of pixels which results in the detection of IR energy provides an indication of the location of the mirror in the stylus relative to the projected image.

A further embodiment utilizes the scanning ability of the DMD array to scan an image into a digital storage device. The image is focused on the DMD array which is sequentially scanned. As each pixel mirror is energized, the light from that mirror is sensed by a detector and the output passed to a digital storage location. After a complete scan, the complete digital image would be present in the storage medium. For color images, scanning through a color wheel, with one scan for each color, will provide a digital color image.

BRIEF DESCRIPTION OF THE DRAWINGS

FIG. 8 is a perspective view of a DMD projector operating in conjunction with an emitter stylus;

FIG. 9 is a circuit block diagram of the operation of the emitter stylus embodiment;

DETAILED DISCUSSION OF PREFERRED EMBODIMENTS

The following detailed description refers to four distinct embodiments of Applicant's invention where, among the various embodiments, the same structures are labelled in the same fashion so as to provide continuity of understanding among the several views.

Detector Stylus Embodiment

Figure 1:
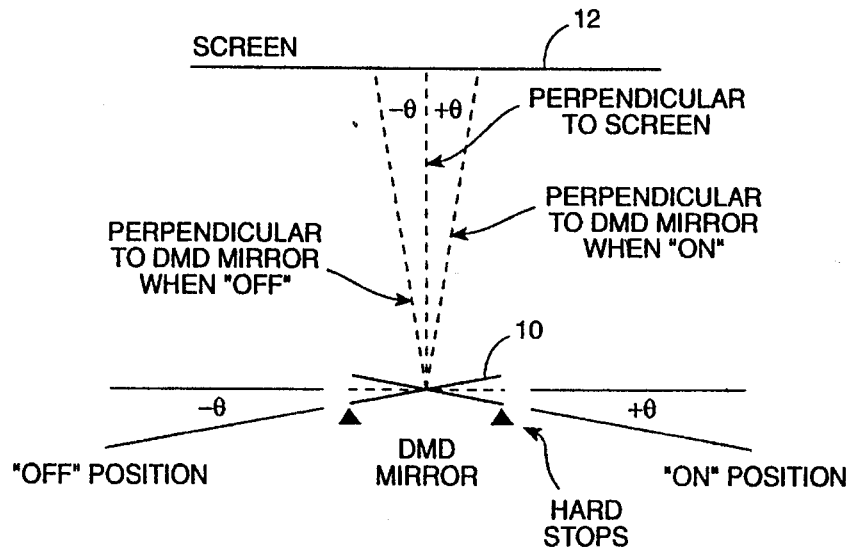
FIG. 1 is a side view illustrating known basic DMD pixel operation.
Figure 2:
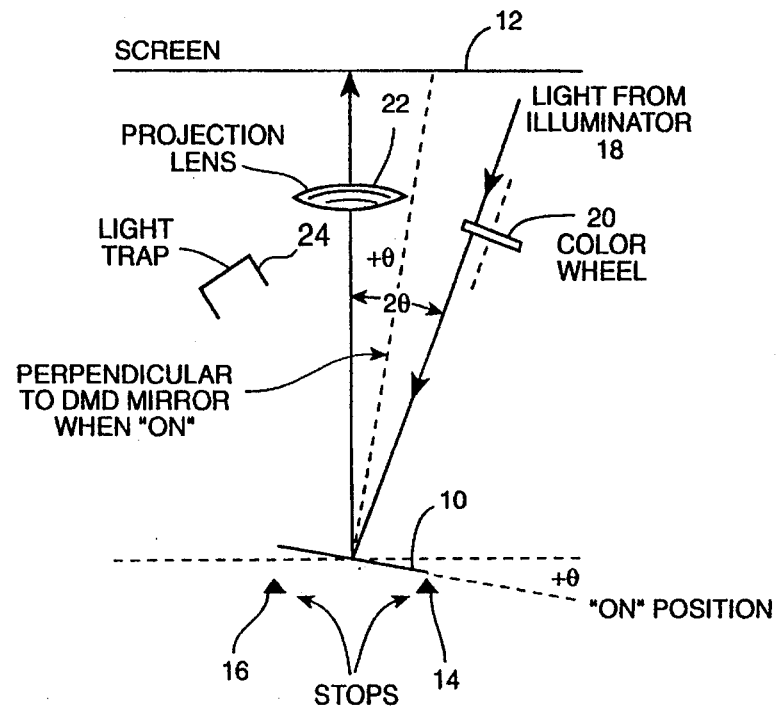
FIG. 2 is a side view illustrating a known DMD projector operation with the pixel in an "ON" condition.
Figure 3:
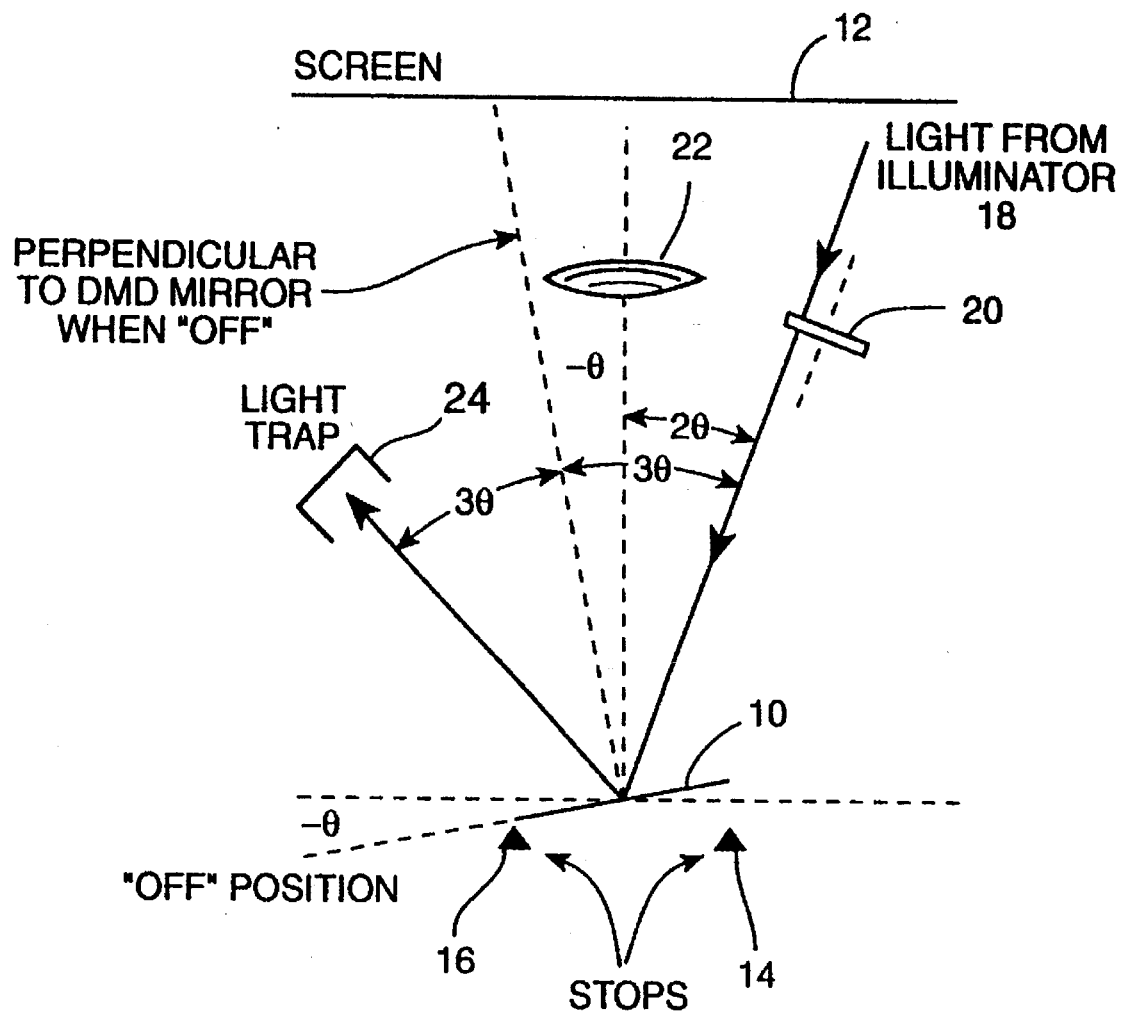
FIG. 3 is a side view illustrating a known DMD projector operation with the pixel in an "OFF" condition.
Figure 4:
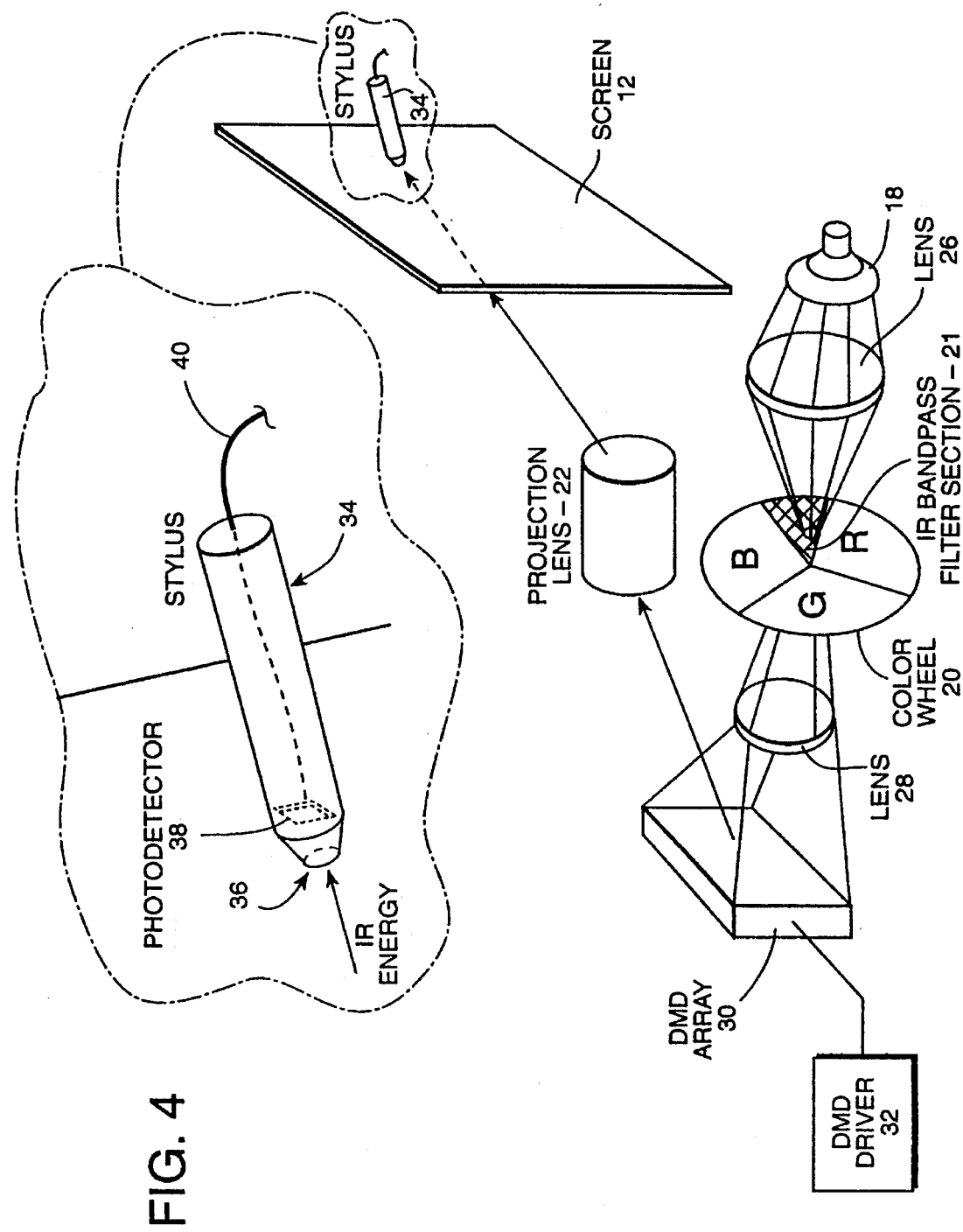
FIG. 4 is a perspective view of a DMD projector and a detector stylus embodiment.

FIG. 4 illustrates in a perspective view the component arrangement for a color DMD projector with a stylus having a detector which is responsive to infrared radiation. Illumination source 18 provides radiation which is focused by lens 26 upon rotating color wheel 20. In addition to red, green and blue segments, color wheel 20 has a segment 21 which provides an infrared radiation pass filter permitting only infrared radiation to pass through the color wheel and onto the lens 28. The DMD array 30 comprises a plurality of individual DMD pixel mirrors as previously discussed.

The DMD array 30 is positioned such that visible light or infrared radiation from lens 28 is reflected through lens 22 onto screen 12 when the pixel mirrors are in their "energized state" (this may be the "ON" or "OFF" position, depending on the orientation). The "energized state" is defined as the position in which the micromirrors reflect the light through the projection lens and onto screen 12. DMD driver 32 provides the appropriate signals to modulate the energization and de-energization of each of the pixel mirrors contained in the DMD array 30, thereby causing the desired image to be projected onto screen 12.

The detector stylus 34 includes an aperture 36 for admission of IR infrared energy, a photodetector 38 for detecting the presence of IR energy entering through aperture 36 and a photodetector output line which in one embodiment is a cable 40 and in another embodiment is a "wireless" relay system such as an IR or RF link. Accordingly, whenever IR energy is sensed by the photodetector, an output is provided on the cable 40. Accordingly, while the apparatus shown in FIG. 4 will project color images on screen 12 (which may be a front projection or a rear projection screen as desired), the stylus is responsive to infrared radiation being perceived at a point toward which the stylus is directed.

The image which is projected on screen 12 is generally comprised of a series of frames which are separated by a finite time duration. During each frame, of course, the individual DMD pixel mirrors 10 are modulated at their appropriate duty cycle with red, green and blue light projected thereon so as to provide the appropriate mix of colors and intensities at the corresponding pixel location on screen 12 to "paint"the desired color at that spot. The total of all of the DMD pixel mirrors is to paint an image on the screen. Each screen or frame image is separated from a following frame image by a finite time duration and it is during this duration that stylus positioning information is determined.

Figure 6A:
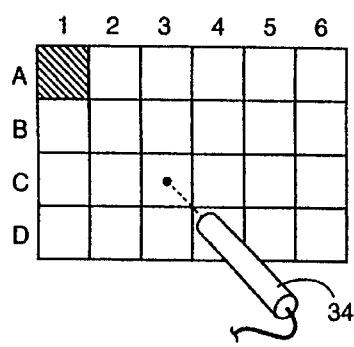
FIGS. 6(a) through 6(c) illustrate a sequential DMD pixel mirror scan.
Figure 6B:
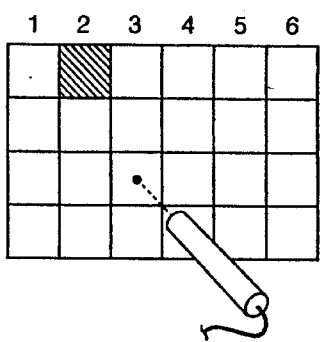
Figure 6C:
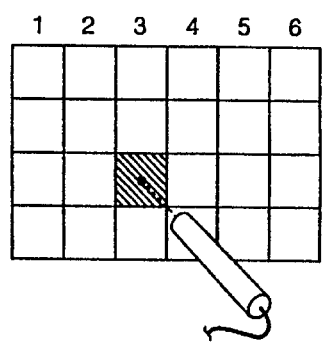

There are numerous different sequencing schemes which could be applied to the individual DMD pixel mirrors 10 in the DMD array 30 which would work, although two preferred embodiments are disclosed in this application. Attention is directed to FIGS. 6(a)–6(c) which, in a simplified form, illustrate the operation of the sequential scan. At the beginning of the time duration between images, and during the time period in which infrared radiation is directed towards the DMD array 30, each of the pixels is sequentially energized, i.e., moved to the "energized" position (either "ON" or "OFF") so that IR radiation is reflected through projection lens 22 and onto screen 12.

In FIG. 6(a), the stylus 34 is shown to be looking at a spot which is identified as pixel C-3. The pixel scan begins with pixel mirror A-1 and this pixel is energized and thereby reflects infrared radiation to the location of pixel A-1 on screen 12. Since the stylus is not "looking" at pixel A-1, no output is provided from the stylus. The pixel energization sequence continues in any desired fashion (here shown in a linear progression across each row and then moving down to the next row in sequence). Only when pixel location C-3 is reached does the stylus provide an output since it "sees" the IR illumination at this pixel. Because the time of each pixels energization in the pixel sequence, whether linear or random or some other sequence, is known and the precise time that the stylus "sees" IR radiation is known, the result is the pixel location of the stylus position is known. As long as the pixel scanning sequence is completed during the duration between projected frames, a highly accurate, high speed update of stylus position can be obtained in this fashion.

Figure 7A:
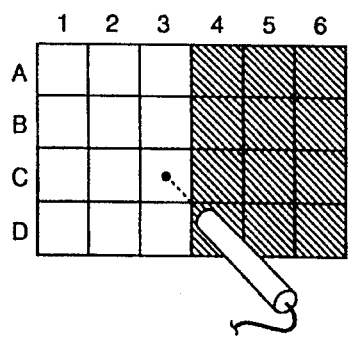
FIGS. 7(a) through 7(c) illustrate a binary DMD pixel mirror scan.
Figure 7B:
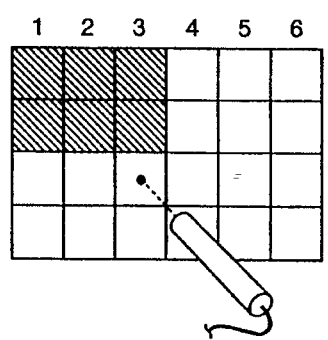
Figure 7C:
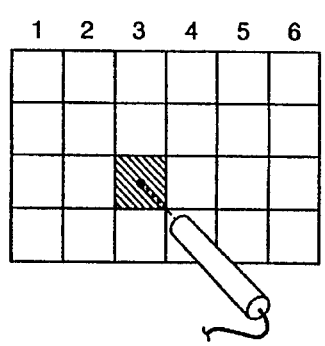

One drawback of the sequencing method shown in FIGS. 6(a)–6(c) is that the scan must go through each and every pixel requiring substantial scanning and a relatively long duration, An improved scan which requires less time is shown in FIGS. 7(a)–7(c). Here, a "binary" scan energizes a whole series of pixel mirrors at a time. In FIG. 7(a), pixel locations 4–6 in columns A–D are all energized at once. If the stylus detects no infrared radiation, no further scanning of these pixels is necessary (because the stylus position is not within this block) and the number of pixels to be scanned in the future has been reduced by 50%.

Since with the single step it has been determined that the stylus position is located within columns 1–3 of rows A–D, half of the remaining area is energized. The energization of rows A and B, columns 1–3, is shown in FIG. 7(b). Again, because stylus does not "see" any IR radiation, the area in which the stylus position is located has been narrowed down to either row C or D and columns 1–3. At this point, a sequential scan in row C, beginning with column 1, will find the stylus position at C-3 after three energizations. Thus, in order to find the stylus position at FIG. 7(c), two binary operations (one shown in FIG. 7(a) and one shown in FIG. 7(b)), and three sequential operation (the third of which is shown in FIG. 7(c)), are necessary to determine the position. Accordingly, only time necessary for a total of five energizations will locate the C-3 pixel utilizing the binary method shown in FIG. 7. It is noted that the sequential method in FIG. 6 will require time for 15 separate energizations (row A, columns 1–6, row B, columns 1–6 and row C, columns 1–3). Accordingly, it can be seen that with a binary search sequence, the stylus position can be determined with fewer pixel energizations.

Figure 5:
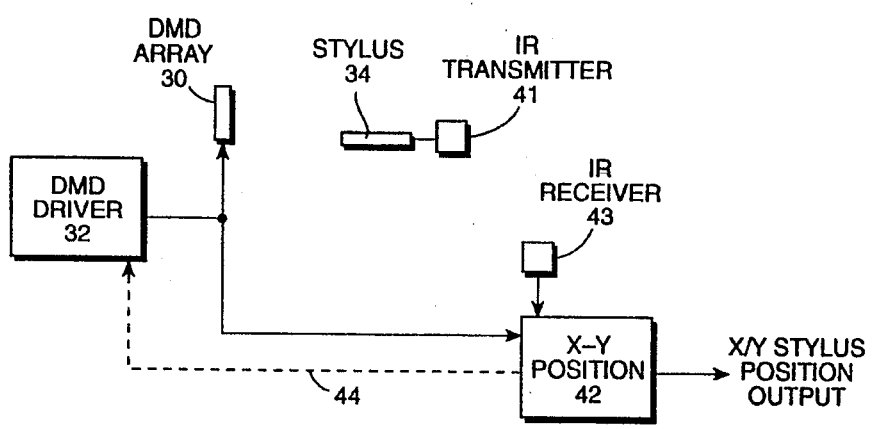
FIG. 5 is a block diagram of the electronic circuitry for providing stylus position output for the stylus detector embodiment.

FIG. 5 is a block diagram of a circuit for providing an X-Y stylus position output with the embodiment disclosed in FIG. 4 except that a wireless IR link has been used. During the finite time duration between successive projected frame images, DMD driver 32 applies any desired search sequence (in a preferred embodiment, a binary search sequence) to the DMD array 30. At the same time, it applies the search sequence information to X-Y position block 42. Position block 42 may be any one of a number of structures in which position addresses are sequentially energized by the DMD driver. When stylus 34 senses IR radiation, it provides the photodetector output to the IR transmitter 41 to the IR receiver 43. The IR receiver 43 provides the X-Y position block 42 with the indication that the stylus has received the radiation from the screen. The X-Y stylus position output which indicates the location of the specific DMD pixel mirror which is being energized at that time by the DMD driver 32.

Where the energization sequence is a binary sequence as discussed in conjunction with FIG. 7, a position output would not be provided until the individual pixel sequencing has identified a single pixel which controls the radiation perceived by the stylus. Furthermore, in a preferred embodiment, position feedback 44 (as indicated in phantom line in FIG. 5) may be used to direct the DMD driver to search first in the area adjacent the last known stylus position. For example, where, in FIG. 7(c) the stylus position was found to be within the quadrant of rows C and D, columns 1–3, the first energization sequence might start with that quadrant, thereby further expediting the search sequence.

Of course, the detector stylus embodiment could detect any frequency of radiation and, thus, IR radiation is not necessarily required. In fact, as long as the radiation were not high contrast with the background of the screen or its duration during scan so brief as to cause not perceptible flicker, any color could be utilized. Further, the radiation could be pulse code modulated by the individual pixel mirror with the detector 38 and any associated amplification circuity inclusive of a filter responsive to the specific pulse code modulation so as to raise the signal-to-noise ratio. Indeed, different types of pulse code modulation or different frequencies or combinations of the two could be utilized such that the system is responsive to multiple stylus locations or functions, e.g., erase, draw red, draw green, etc.

Emitter Stylus Embodiment

FIG. 8 illustrates a further embodiment of the present invention in which the stylus is not required to provide any signal back to the X-Y position block. FIG. 8 illustrates a similar system as that shown in FIG. 4 with the DMD driver and projection optics almost identical. It is noted that while the color wheel 20 does not need to include an IR segment, it does include an opaque segment 54. Stylus 46 is equipped with a light source which, in a preferred embodiment, could be a light emitting diode or a small hand-held laser. Again, while the device is shown with a back projection system, it is equally applicable to front projector systems.

The stylus 46 includes the light emitting diode and aperture 36 through which light passes. The DMD array 30 is located in such a position that light from lens 28 directed at the pixel mirrors in the DMD array 30 is reflected when an individual pixel mirror is energized so as to pass through projection lens 22, creating the desired image on screen 12. As will later be seen (in the discussion relating to FIG. 11), light coming from the screen (from the light emitting stylus) passes through the projection lens 22 is reflected from the appropriate pixel mirror in the DMD array 30 towards lens 50 and from there to photodetector 52. Light from illumination source 18 is interrupted when opaque segment 54 on color wheel 20 is encountered.

In the embodiment shown in FIG. 8, the light which normally illuminates screen 12, especially when a DMD device is in the energized position, is interrupted by opaque segment 54. However, it can be seen that any light on the screen (caused by the light emitting stylus) would be fed back through projection lens 22, reflected off of the energized pixels in the DMD array and directed back towards the lens 28 and color wheel 20. However, de-energized pixels would reflect the light in a different direction and in this instance, towards lens 50 and photodetector 52. Accordingly, a sequential or binary or other search system in the embodiment shown in FIG. 8 would maintain pixels in the "ON" position except for each pixel or block of pixels which are being scanned and they would be turned to the "OFF" position for the scan. Therefore, using the search sequence in FIGS. 6 and 7, the dark squares would indicate pixels which have been turned "OFF."

Figure 11:
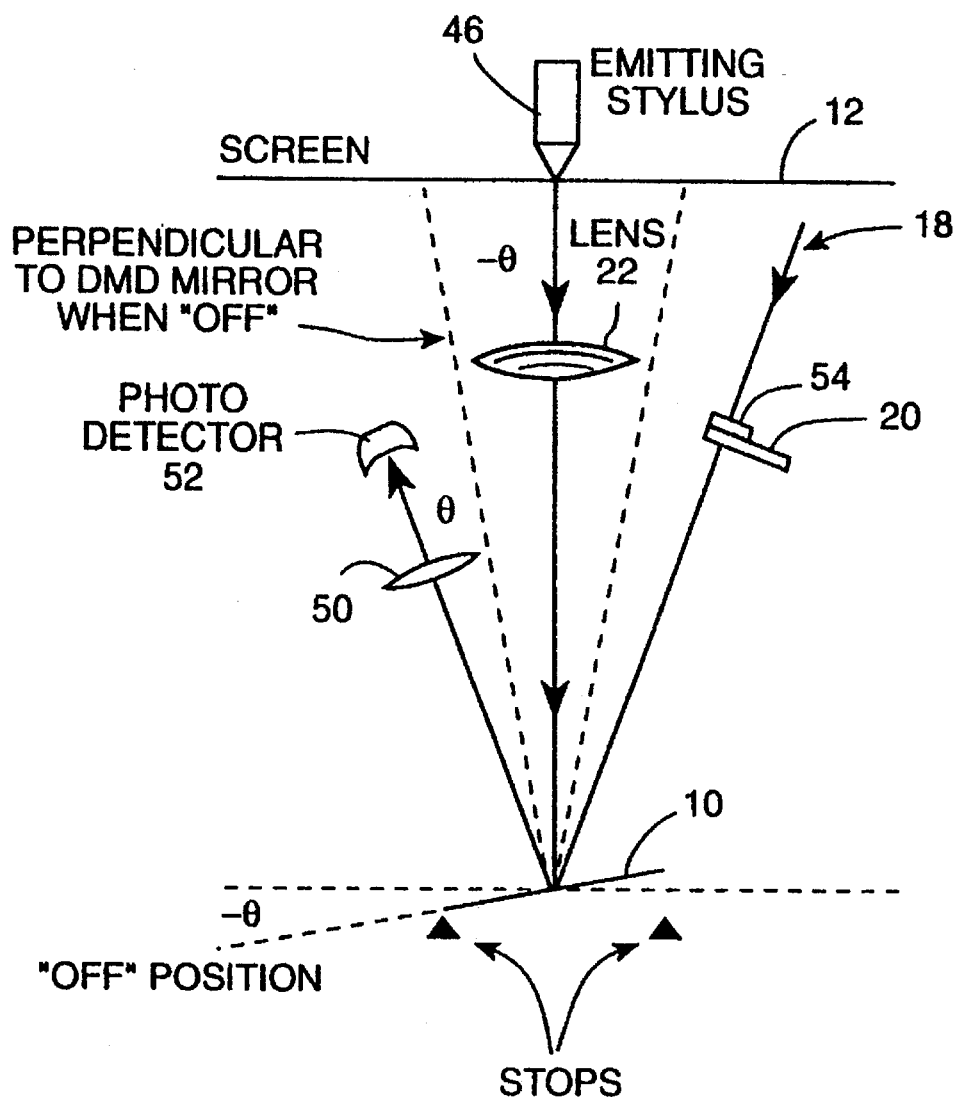
FIG. 11 is a side view of one embodiment of an emitting stylus operating in the "ON-to-OFF" scanning mode.

The illustration of this embodiment in which scanned pixels are turned from "ON" to "OFF" is shown in FIG. 11 where the light from illumination source 18 during energization would pass through color wheel 20, be reflected from the "ON" pixels and be projected through lens 22 onto screen 12. However, the pixel mirror 10 is shown in the "OFF" position where light from the screen 12 created by the light emitting stylus 46 passes through the projection lens 22 and is reflected at a further angle through the lens 50 to the photodetector 52. The use of opaque segment 54 prevents light from the illumination source 18 from illuminating the screen 12 during the period in which the search for the light emitting stylus pixel location is being conducted so as to improve contrast. The opaque segment 54 may not be necessary if the stylus light is of a particular frequency or wavelength (as in a laser) or is pulse code modulated and the output of photodetector 52 is filtered in accordance with the pulse code modulation (the pulse code modulation significantly increases the signal-to-noise ratio and may eliminate the need for the opaque segment 54).

FIG. 9 illustrates in block diagram form the operation of the light emitting stylus embodiment. As discussed previously with either an energized or de-energized pixel mirror (depending upon whether it is the "ON-to-OFF or "OFF-to-ON" position scanning mode) is deflected from the DMD array to the photodetector 52 which, upon receiving the light from the stylus, provides an output to the X-Y position block 42. Similarly, the DMD driver provides an indication of the energized (or deenergized) pixels on the DMD array 30 to the X-Y position block 42 such that when an energized (or deenergized) pixel results in an output from photodetector 52, that pixel location is provided as the X/Y stylus position output. Again, either a sequential, binary or other search game can be utilized and where desirable, a last position feedback loop 44 to the DMD driver can initiate the search in the immediate location of the last stylus position.

As discussed above, it was seen in FIG. 11 that detection was possible by scanning the pixel mirrors in the "OFF" position. However, it may be desirable to scan pixels in the "ON" position and a slight modification of the device will be necessary. Because in the "energized" position, by definition, illuminating light is directed through the projection lens to the screen 12, light from that same position on screen 12 will be directed back through the projection optics towards the illumination source. Because the light emitted from the stylus is substantially less than the light from the illumination source, it is not only necessary to block the light from the illumination source as with the opaque segment 54, but also to reflect the stylus light to a suitable photodetector. This is accomplished by the location of a suitable reflector 56 on the DMD mirror array side of the color wheel which may be conveniently located over the opaque segment 54.

Reflector 56 would serve to reflect any light from the light emitting stylus and reflected from the "ON" position (energized) of the DMD pixel mirror 10 back along the optical axis towards the illumination source 18. However, the reflector 56 on the color wheel will reflect this light from the stylus to detector 52. Quite obviously, with the DMD pixel mirror 10 in the "OFF" position, light from the emitting stylus is not reflected back towards the color wheel and therefore would not impinge upon detector 52. Accordingly, in the scanning sequence to determine the stylus position, pixel mirrors would normally be in the "OFF" position and would either be sequentially "energized" or energized in binary or some other energizing sequence so as to provide the previously discussed scan.

Figure 10:
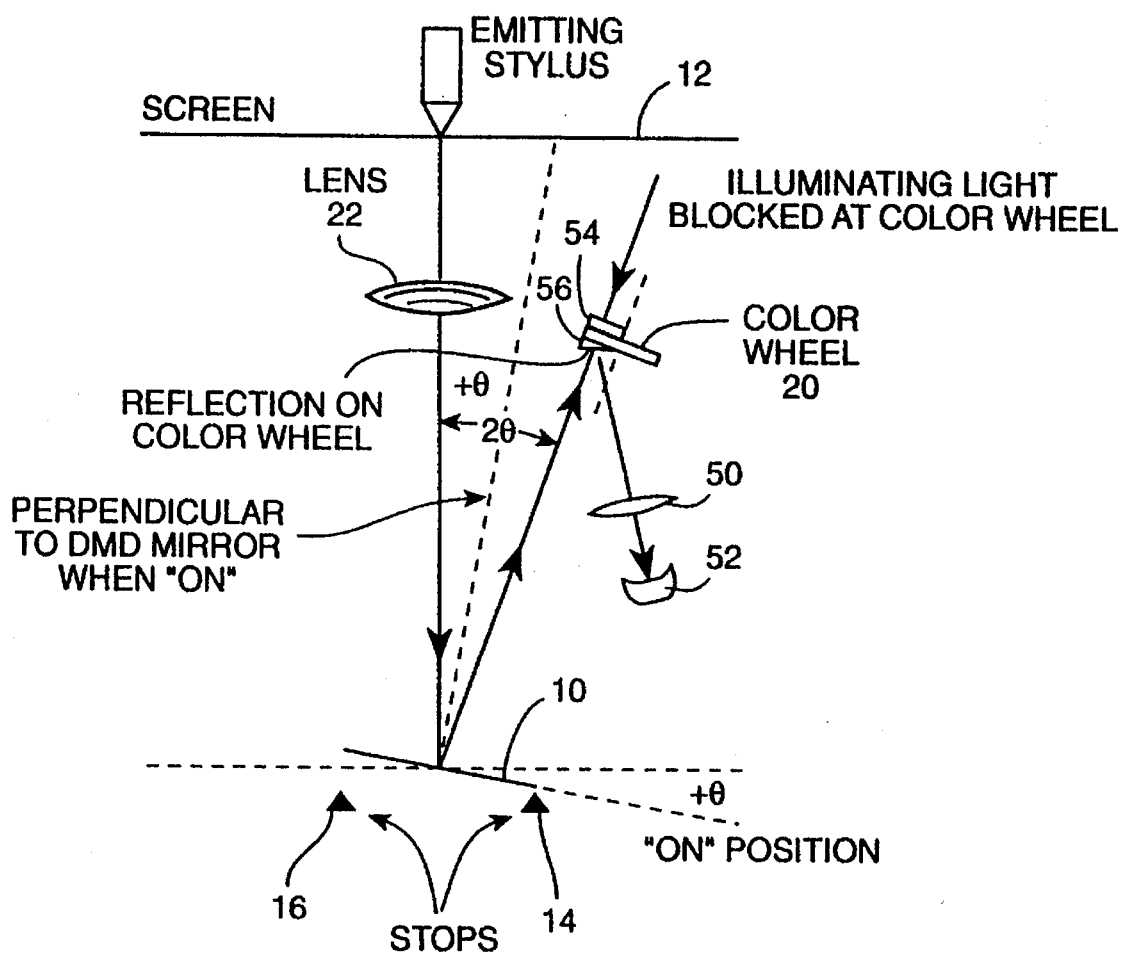
FIG. 10 is a side view of one embodiment of an emitting stylus operating in the "OFF-to-ON" position scanning mode.

Therefore, as shown in FIGS. 10 and 11, the DMD projector with a light emitting stylus could be utilized in either an "ON-to-OFF" or "OFF-to-ON" position scanning mode.

Reflector Stylus Embodiment

Figure 12:
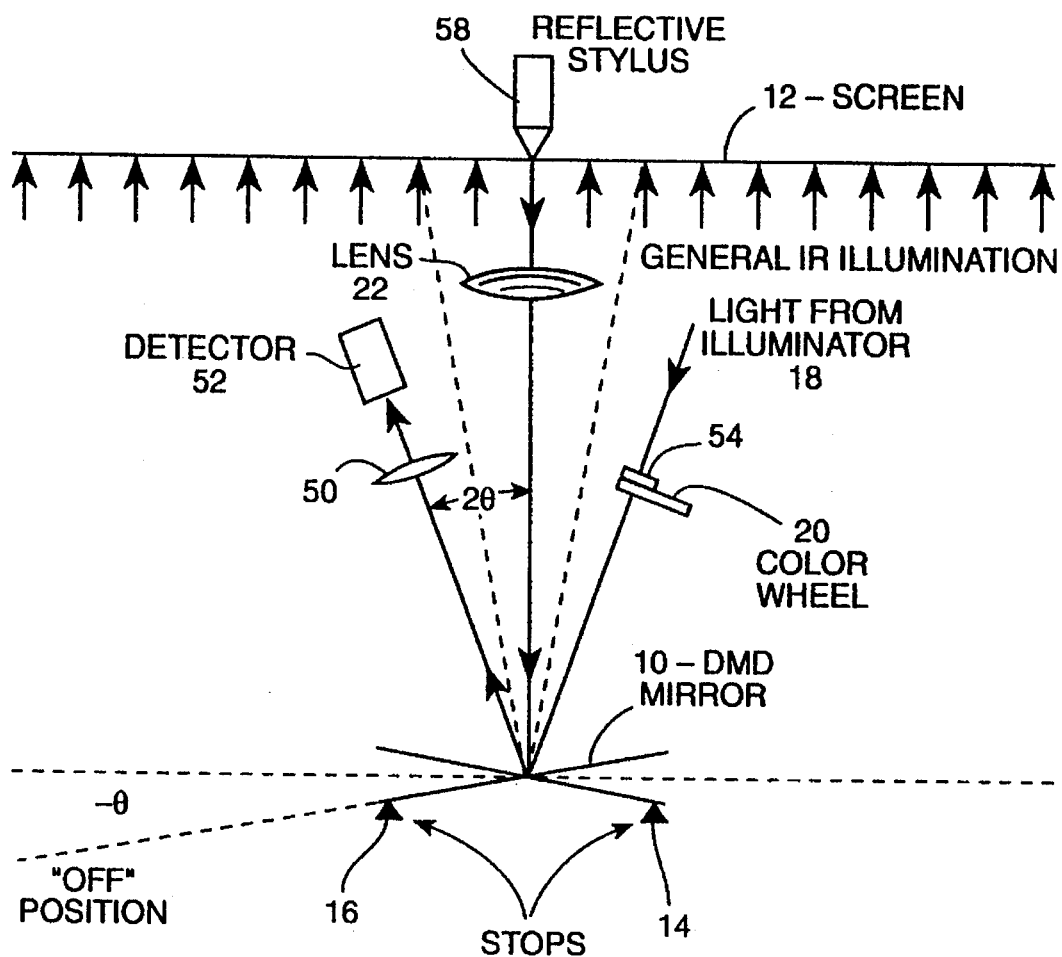
FIG. 12 is a side view illustrating the operation of the reflective stylus embodiment of the present invention.
Figure 13:
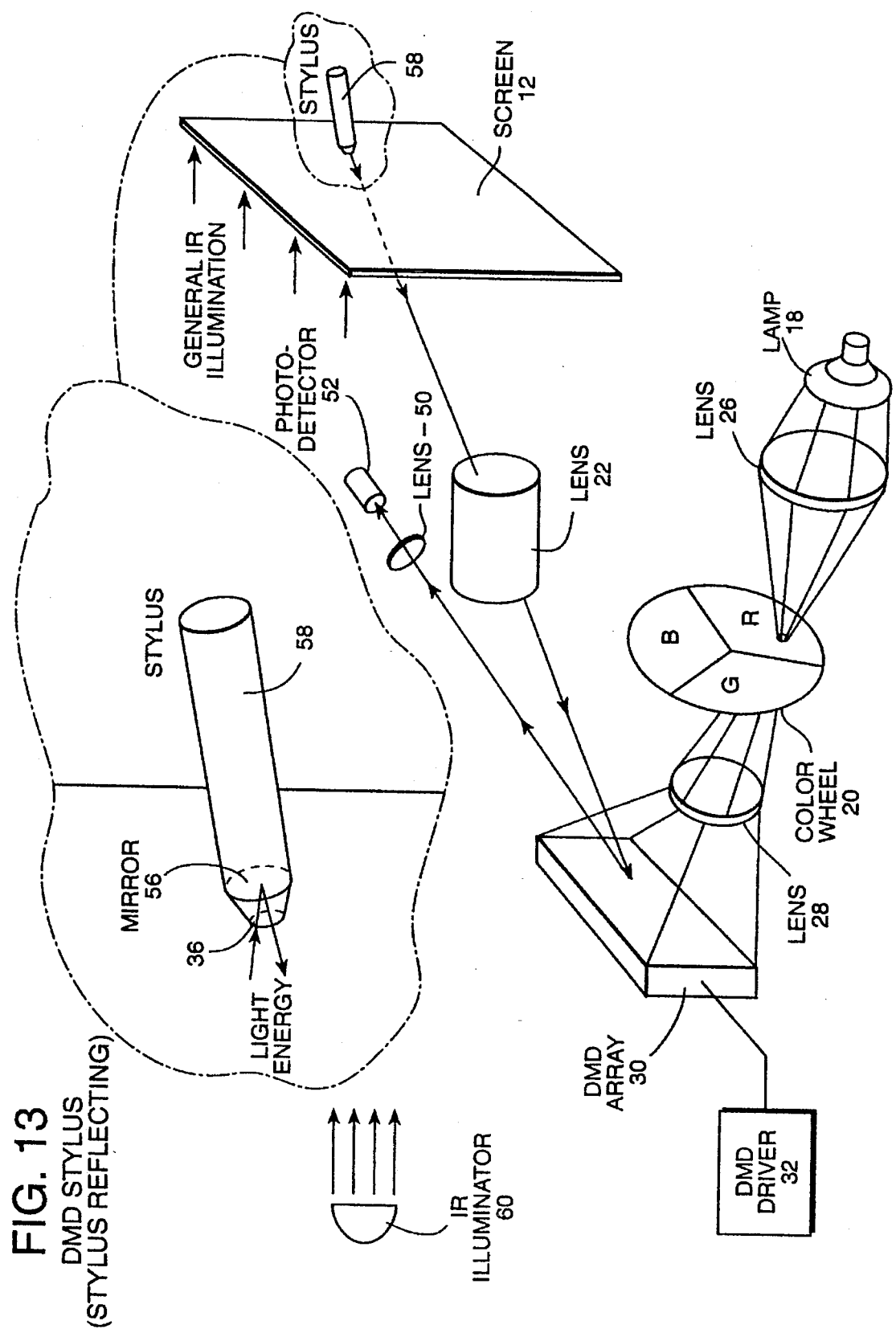
FIG. 13 is a perspective view of the operation of the reflector stylus embodiment.

FIGS. 12 and 13 are directed towards a further and perhaps more general low-cost stylus embodiment in which a mirror 56 is located in the reflector stylus 58. The mirror 56 is located close to aperture 36 so that radiation into the aperture is reflected back towards the screen 12. An IR illumination source 60 illuminates the area of the screen with general infrared radiation as shown in FIG. 13. The device operates in a manner similar to the FIG. 11 embodiment in that when DMD mirror 10 is "deenergized" to the "OFF" position, except that general IR illumination of the screen takes place. IR light directed towards the screen is reflected by a mirror 56 in reflector stylus 58 back through projection lens 22. It is reflected from the "OFF" position DMD mirror, through lens 50 and is detected by detector 52.

Thus, the scan of DMD pixel mirrors is accomplished by energizing all other mirrors and turning to the "OFF" position, those mirrors which are being sequenced. Because screen 12 does not generally reflect the IR illumination, no infrared radiation will be received by the detector 52 until the pixel closest to the reflective stylus is de-energized to the "OFF" position at which point the detector will register the receipt of IR radiation. Again, since it would be desirable to block light from the illumination source 18 during the period of pixel sequencing, opaque segment 54 on color wheel 20 would be utilized. Also, to improve signal-to-noise ratio, the general IR illumination of the screen could be pulse code modulated or of a particular frequency or a combination of the two which results in a higher signal-to-noise ratio at detector 52.

In view of the above, three specific embodiments of stylus position locating systems are disclosed which would allow an operator to communicate with a computer which is disclosed in U.S. Pat. No. 5,235,363, entitled "Method and Apparatus for Interacting With a Computer Generated Projected Image," issued Aug. 10, 1993 to Vogeley et al. However, the present inventors have also found that many of the structures utilized in the stylus detection systems can also be used in conjunction with the DMD array as a digital camera. Although the systems described herein utilize a color wheel, one of ordinary skill in this art will appreciate that the inventions could easily be incorporated into multiple channel systems, e.g. a three channel display system. In such an application, during a suitable interval between display frames, at least one of the three channels (or a fourth independent channel dedicated to stylus position sensing only) would be used to provide position sensing using any of the embodiments previously described.

Digital Camera Embodiment

Figure 14:
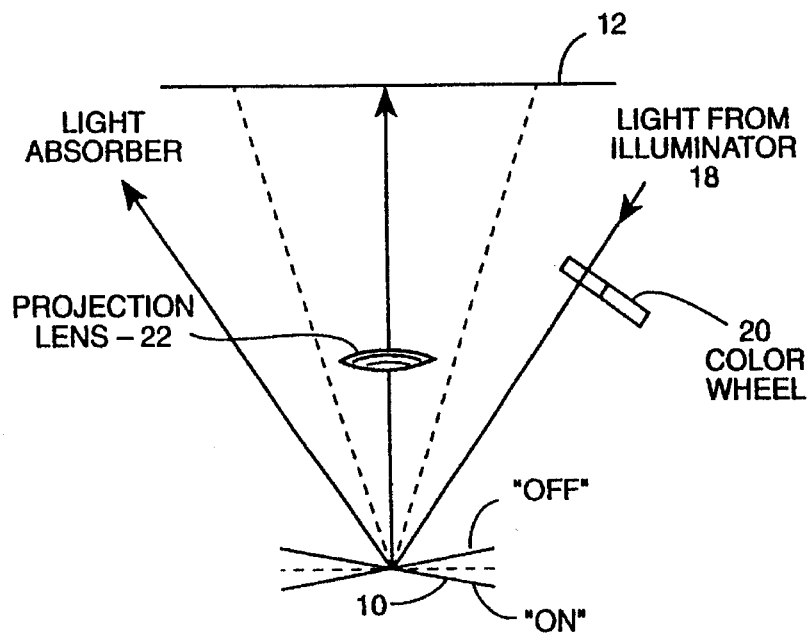
FIG. 14 is a side view illustrating a simplified known DMD projector.

A brief review of the conventional requirements for a DMD array projector can be had by reference to FIG. 14. It can be seen that color wheel 20 breaks up the generally white light from illumination source 18 and through appropriate lenses (not shown) applies the light evenly to each of the multitude of DMD pixel mirrors 10 which comprises the DMD array. Depending upon the desired intensity and color of the light, the individual array is modulated and the resultant light transmitted through projection lens 22 and is visible on screen 12. The light from the multitude of pixel mirrors forms the image on screen 12 (which can be a front or rear projection screen). The pixel mirrors are modulated between their "ON" and "OFF" positions so that light or no light is transmitted back through the projection lens 22.

Figure 15:
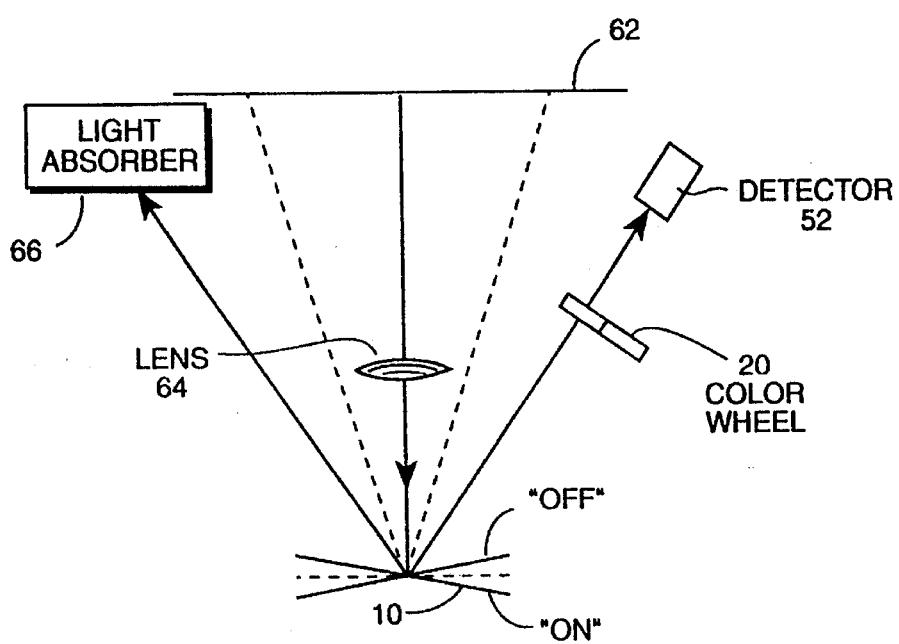
FIG. 15 is a side view of a digital camera utilizing a DMD device in accordance with another embodiment of the present invention.

Applicants have discovered that similar structures can be used to create in effect a digital camera and the basic embodiment is shown in FIG. 15. Light from the camera subject 62 is transmitted through camera lens 64 until it reaches the DMD pixel mirrors of the DMD array. Normally the mirrors are in the "OFF" position where light is reflected to the light absorber 66 which may be a flat black surface or other light absorbent material. Pixel by pixel, the mirrors are briefly turned on and then off again so that the light passes through color wheel 20 to detector 52 (the desirable camera optics have been omitted for clarity of illustration). A complete scan of each DMD pixel mirror in the DMD array for each red, green and blue segment on the color wheel will provide complete digital information as to the color and intensity at each pixel, thereby clearly characterizing the image or camera subject 62.

Figure 16:
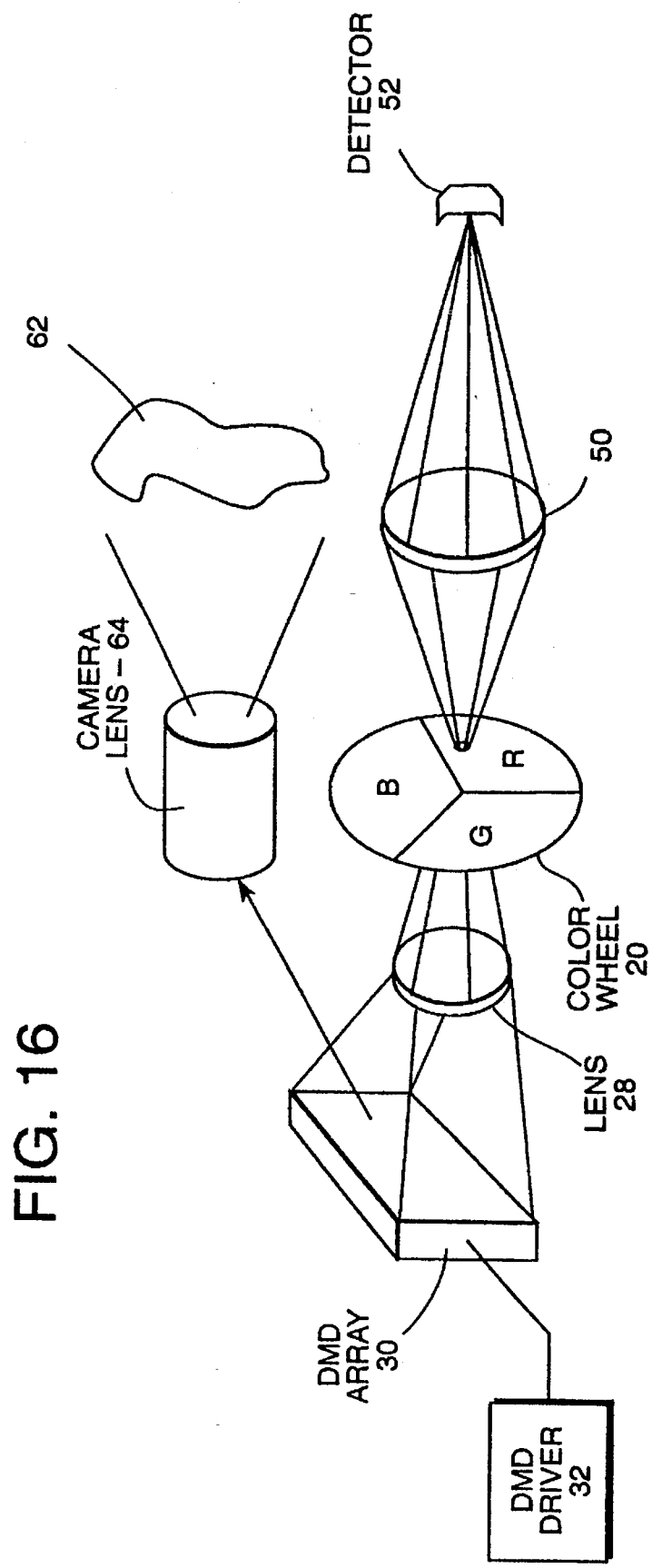
FIG. 16 is a perspective view of the digital camera embodiment of the present invention.

FIG. 16 is a perspective view, perhaps more clearly illustrating the light path from camera subject 62 through the camera lens which is then directed on the DMD array 30. DMD driver 32 sequentially, in a predetermined order, energizes each of the pixel mirrors contained in the DMD array 30. Because only one pixel mirror is energized at a time, only the light from that single pixel is transmitted through lens 28 and through the red segment of the color wheel and is focused by lens 50 on detector 52. Thus, detector 52 will provide an output equal to the intensity of the red light component of light reflected from that individual pixel mirror. As the color wheel 20 rotates, while light is focused through the red segment, each of the pixel mirrors is sequenced such that the detector 52 provides an output corresponding to the red light component of the entire camera subject 62.

Similarly, the detector provides an output for the blue and green components as the color wheel rotates to those particular segments. In one rotation of the color wheel (which may be rotating at up to a thousand revolutions per second), the output from detector 52 characterizes all information to digitally reproduce the camera subject 62.

Figure 17B:
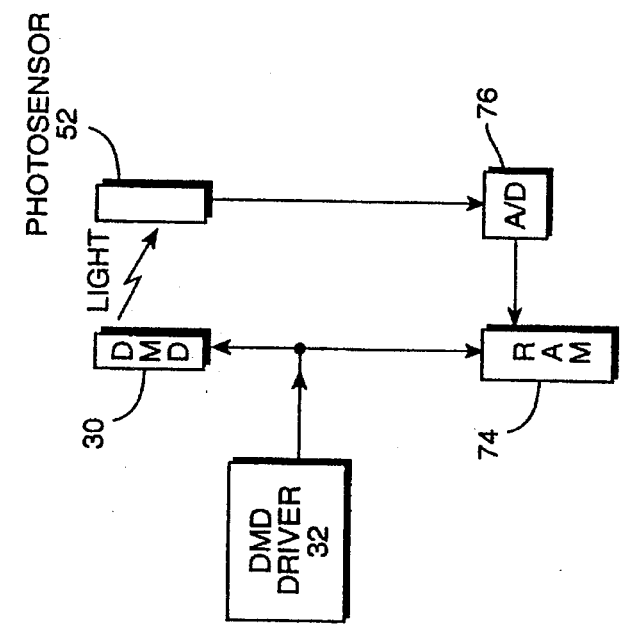
FIGS. 17(a) and 17(b) are block diagrams of generic and specific embodiments of the digital camera according to the present invention.

FIG. 17(*a*) shows a general digital camera block diagram with DMD array 30 which is sequenced in a predetermined scan, as previously discussed, by the DMD driver 32. The sequencing information is provided to image storage and processing block 68 to enable the light readings taken by photosensor 52 to be placed in the address appropriate for the pixel which has been energized by the driver. Although a black and white embodiment is shown, a color wheel position sensor 70 is shown in dotted line (or other synchronization device to ensure that sequencing information is synchronized with the colors which are being deflected onto the photosensor) which could be utilized if a color image is to be stored. This position sensing or synchronization ensures that each of the primary colors enables the DMD driver to sequence the DMD array and that each of the illumination detected for each of the color wheel colors is recorded by photosensor 52 is stored in the appropriate color for that pixel in the image storage and processing block 68.

Figure 17A:
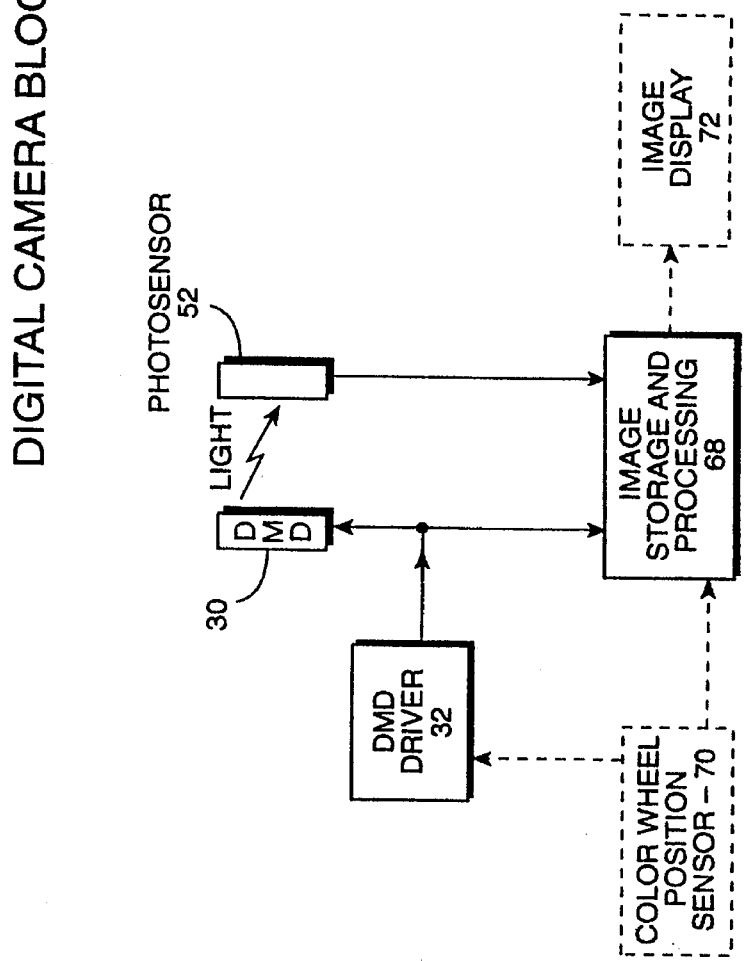

Whenever display of the image is desired, the pixel addresses are interrogated and the output of each of the three colors in each pixel can be provided to an image display 72. FIG. 17(*b*) shows a preferred embodiment of a black and white digital camera in which the DMD driver provides an output not only to DMD array 30 but also to random access memory (RAM) 74. The output of light reflected from the individual pixel mirrors is received by photosensor 52 and the output provided to analog to digital converter 76. The digital output from converter 76 is applied to the RAM 74 at the particular storage locations identified by the DMD driver 32. In this way, a complete black and white image can be stored in RAM 74 and is capable of being read out by merely interrogating each pixel location for the light level of the image at that location. With the addition of the color wheel position sensor 70 discussed in conjunction with FIG. 17(a) (or other suitable synchronization) and suitable outputs to the DMD driver 32 and to RAM 74, a color image can be stored, although this would require approximately three times the storage capacity in the random access memory.

Although for recording color images a color wheel has been shown, one could also utilize three separate detectors using red, green and blue filters or a combination of red, green and blue sensitive photodiodes for recording color data simultaneously and providing these three channels of color data to the image recording system. Because of the similarity between the digital camera shown in FIG. 16 and the color projector equipped with a light emitting stylus in FIG. 8, both the camera and projector with stylus devices could be included in a single device. Operating as a projector, the stylus function would be invaluable for an operator to interrelate with a computer (in much the same fashion as a mouse is used with a conventional personal computer) generating the projected image.

As a camera, the illumination light could be turned off or temporarily blocked, allowing the machine to record any remaining image or different images projected on the screen. While two separate color wheels could be used, one for the stylus projection combination and the other for the digital camera embodiment, an improved device would locate a single color wheel in a location so that it can serve either the projector or camera function. Furthermore, the digital camera is not limited to simple storage and retrieval. It is suitable as a sensor for various additional functions such as position sensing, spatial measurement, temperature profilometry (measurement of temperature profiles), etc.

While many modifications of the above devices will be obvious to those or ordinary skill in the art in conjunction with this disclosure, it is noted that the particulars of the DMD array are not critical. The DMD "ON" and "OFF" mirror angles need not be fixed at 10° and do not even need to be the same angle. The screen might be inclined with respect to the DMD chip and/or mirrors as in normal projector operations producing keystoning and requiring some keystoning correction. The chip and the projection lens geometry could be made adjustable for keystone correction. The various light paths could be bent or deflected by the use of prisms, mirrors, etc. for optimum packaging purposes. As noted earlier, either front or rear projection modes are possible and each of the styluses could be used in either mode.

The stylus emitting radiation could be visible infrared laser whether modulated or unmodulated and whether pulse code modulated or not. The wireless link to the stylus having a detector built in could be either infrared radiation or radio frequency as desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Accordingly, the presently disclosed inventions are not limited by the present disclosure and are limited only by the claims attached hereto.

What is claimed is:

1. A digital camera apparatus for sensing an image, said camera comprising:

a digital micromirror device (DMD) array, said DMD array including a plurality of pixel mirrors controllable between "ON" and "OFF" positions;

optical means for focussing light comprising said image on said DMD array;

detecting means for providing an output responsive to intensities of portions of said image received by said detecting means, when a portion of said image is reflected onto said detecting means by said DMD array;

energizing means for scanning said DMD array by selectively energizing each of said plurality of controllable pixel mirrors; and image storage means, responsive to said detecting means output and said energizing means selective energizing of said plurality of controllable pixel mirrors, for storing detecting means outputs of intensities of portions of said image at storage locations related to the position of each energized controllable pixel mirror.

2. A digital camera apparatus for sensing an image in accordance with claim 1, wherein said energizing means comprises a DMD driver for energizing said plurality of controllable pixel mirrors in a predetermined pattern.

3. A digital camera apparatus for sensing an image in accordance with claim 2, wherein said predetermined pattern is a sequential raster scan.

4. A digital camera apparatus for sensing an image in accordance with claim 1, wherein said energizing means controllably energizes each of said pixel mirrors to an "ON" position in which light from said image is directed towards said detecting means and an "OFF" position in which light from said surface is directed to a light absorbing means.

5. An apparatus for sensing position of a stylus in accordance with claim 4, wherein said energizing means selectively energizes said pixel mirrors by selectively moving said pixel mirrors to said "ON" position while moving non selectively energized pixel mirrors to said "OFF" position in an "OFF-to-ON" scanning mode.

6. A digital camera apparatus for sensing an image in accordance with claim 2, further including a rotating color wheel having at least three segments each segment comprising a primary color pass filter, said color wheel located along an optical path between said detecting means and said image and rotating such that each segment is located in the optical path for a finite time duration, and a means for synchronizing said color wheel rotation with said DMD driver, wherein said DMD driver energizes all of said DMD array pixel mirrors during the finite time duration associated with each segment.

7. A digital camera apparatus for sensing an image in accordance with claim 6, wherein said predetermined pattern is a sequential raster scan.

8. A digital camera apparatus for sensing an image in accordance with claim 7, wherein said energizing means controllably energizes each of said pixel mirrors to an "ON" position in which light from said image is directed towards said detecting means and an "OFF" position in which light from said surface is directed to a light absorbing means.

9. An apparatus for sensing position of a stylus in accordance with claim 8, wherein said energizing means selectively energizes said pixel mirrors by selectively moving said pixel mirrors to said "ON" position while moving non selectively energized pixel mirrors to said "OFF" position in an "OFF-to-ON" scanning mode.

10. An apparatus for sensing position of a stylus in accordance with claim 1, wherein said optical means includes a lens for focussing at least a portion of said image on at least a portion of said DMD array.

11. A digital camera apparatus for sensing an image, said camera comprising:

a digital micromirror device (DMD) array, said DMD array including a plurality of pixel mirrors controllable between "ON" and "OFF" positions;

a lens system for focussing light comprising said image on said DMD array;

a detector for providing an output responsive to intensities of portions of said image received by said detector, when a portion of said image is reflected onto said detector by said DMD array;

a DMD driver for scanning said DMD array by selectively energizing each of said plurality of controllable pixel mirrors; and digital memory, responsive to said detector output and said DMD driver, for storing detector outputs of intensities of portions of said image at storage locations related to the position of each energized of controllable pixel mirror.

12. A digital camera apparatus for sensing an image in accordance with claim 11, wherein said DMD driver energizes said plurality of controllable pixel mirrors in a predetermined pattern.

13. A digital camera apparatus for sensing an image in accordance with claim 12, wherein said predetermined pattern is a sequential raster scan.

14. A digital camera apparatus for sensing an image in accordance with claim 11, wherein said DMD driver controllably energizes each of said pixel mirrors to an "ON" position in which light from said image is directed towards said detector and an "OFF" position in which light from said surface is directed to a light absorber.

15. An apparatus for sensing position of a stylus in accordance with claim 14, wherein said DMD driver selectively energizes said pixel mirrors by selectively moving said pixel mirrors to said "ON" position while moving non selectively energized pixel mirrors to said "OFF" position in an "OFF-to-ON" scanning mode.

16. A digital camera apparatus for sensing an image in accordance with claim 12, further including a rotating color wheel having at least three segments each segment comprising a primary color pass filter, said color wheel located along an optical path between said detector and said image and rotating such that each segment is located in the optical path for a finite time duration, and a color wheel position sensor for synchronizing said color wheel rotation with said DMD driver, wherein said DMD driver energizes all of said DMD array pixel mirrors during the finite time duration associated with each segment.

17. A digital camera apparatus for sensing an image in accordance with claim 16, wherein said predetermined pattern is a sequential raster scan.

18. A digital camera apparatus for sensing an image in accordance with claim 17, wherein said DMD driver controllably energizes each of said pixel mirrors to an "ON" position in which light from said image is directed towards said detector and an "OFF" position in which light from said surface is directed to a light absorber.

19. An apparatus for sensing position of a stylus in accordance with claim 18, wherein said DMD driver selectively energizes said pixel mirrors by selectively moving said pixel mirrors to said "ON" position while moving non selectively energized pixel mirrors to said "OFF" position in an "OFF-to-ON" scanning mode.

* * * * *